Oct. 17, 1961
D. J. PASSA
3,005,187
AUTOMOBILE SIGNAL SYSTEM
Filed Sept. 23, 1960
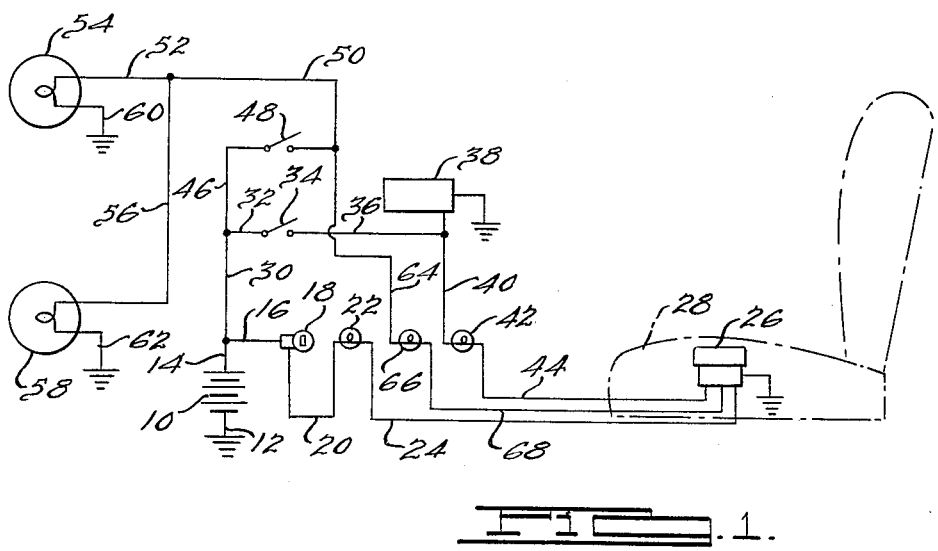
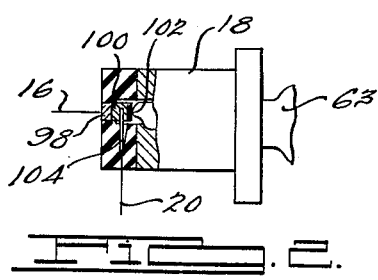
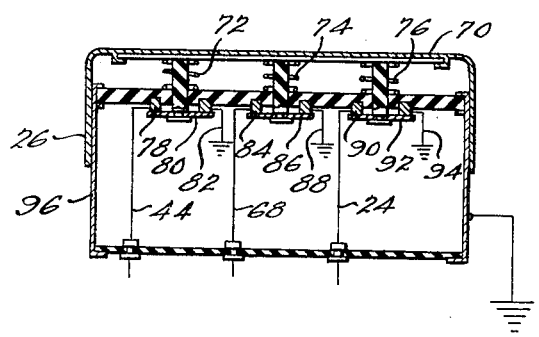
INVENTOR.
Dominick J. Passa
BY
Donald Diamond
ATTORNEY.

United States Patent Office 3,005,187
Patented Oct. 17, 1961

3,005,187
AUTOMOBILE SIGNAL SYSTEM
Dominick J. Passa, 2408 N. Chevrolet Ave.,
Flint 4, Mich.
Filed Sept. 23, 1960, Ser. No. 58,106
2 Claims. (Cl. 340—52)

This invention relates to an electrically actuated signal system for an automobile. In a more specific aspect, this invention relates to a signal system which advises the operator of an automobile departing therefrom as to whether any of the current consuming devices such as the radio, headlights or parking lights is still drawing current from the battery and as to whether the ignition key has been left in the ignition switch.

During the winter season, many people begin their sojourn in their automobiles for their place of employment or other destination in the morning while it is dark or dusk, which condition requires the use of the automobile headlights or parking lights, and arrive at their place of employment or other destination after it has become daylight and quite often leave their automobiles without noticing that the lights are still on. Also, drivers of automobiles quite frequently depart from their automobile without removing the ignition key from the ignition switch.

Accordingly, the principal object of this invention is to provide a signal system which informs the driver departing from an automobile as to whether any of the current consuming devices is still drawing current from the battery and as to whether the key has been left in the key-controlled ignition switch.

Another object of this invention is to provide a plurality of electrically actuated signals mounted on the dashboard of the automobile or on the inside of the door adjacent the operator's seat, which signals are responsive to the positioning of the ignition key in the ignition switch and the passing of current through the current consuming devices functioning in concert with an operator actuated pressure responsive switch disposed within the seat of the automobile.

A further object of this invention is to provide a pressure-responsive switch disposed within the seat of the automobile, which switch is responsive to the presence of the driver in the operator's seat of the automobile.

A still further object of this invention is to provide a pressure-responsive switch in association with the ignition switch, which pressure switch is responsive to the positioning of the key in the ignition switch.

In accordance with this invention, there is provided a signal system for an automobile having a battery, at least one switch controlled current consuming device energized by said battery, and a key controlled ignition switch, comprising a pair of spaced apart electrical contacts associated with said ignition switch, said contacts being closed by positioning the key in the ignition switch, a conductor connecting one of said contacts to said battery and a conductor connecting the other contact to an electrically actuated signal, a conductor connecting the current consuming device at a locus in the circuit extending from the cold-terminal of the current consuming device switch to the current consuming device to a second electrically actuated signal, an operator actuated pressure responsive switch disposed within the seat of said automobile and conductors connecting said electrically actuated signals to said pressure responsive switch.

In the drawing:
FIG. 1 is an electrical diagram of the automobile signal system.
FIG. 2 is a side elevation of an automobile ignition switch partly cut away to show the relationship of the pressure responsive switch to the ignition switch.
FIG. 3 is a schematic illustration of a three-pole, single throw pressure responsive switch.

Referring more particularly to the drawing, an automobile is provided with a battery 10 which is suitably grounded at one side as indicated by reference numeral 12. The other side is connected by wires 14 and 16 to one contact 98 of a pressure responsive switch mounted in juxtaposition to the ignition switch 18. The other contact 100 of the pressure responsive switch is connected by a wire 20 to an electrically actuated signal 22 which preferably takes the form of a small lamp mounted in the dashboard of the automobile. The electrically actuated signal 22 is connected by a wire 24 to one contact 90 of a three-pole, single throw pressure responsive switch 26 disposed within the seat 28 of the automobile. The contact 90 is connected to the ground wire 94 by a conductor 92 mounted on an insulator connected to the cover 70 of the pressure switch.

The battery is connected to a radio 38 disposed within the automobile through wires 14, 30 and 32, radio switch 34, and wire 36. The radio is suitably grounded. A wire 40 connects wire 36 and preferably the cold-terminal of the radio switch 34 to an electrically actuated signal 42 which can take the form of a small signal lamp. The electrically actuated signal 42 is connected by a wire 44 to one contact 78 of a three-pole, single throw pressure responsive switch 26 disposed within the seat 28 of the automobile. This contact 78 is connected to a ground wire 82 by a conductor 80 mounted on an insulator attached to the cover 70 of the pressure switch.

The battery 10 is connected to the automobile headlights 54 and 58 through wires 14, 30 and 46, headlight switch 48, and wires 50, 52 and 56. The headlights are suitably grounded as illustrated by reference numerals 60 and 62. A wire 64 connects wire 50 and preferably the cold-terminal of the light switch 48 to an electrically actuated signal 66 which can take the form of a small signal lamp mounted in the dashboard of the automobile. The electrically actuated signal 66 is connected by a wire 68 to a contact 84 of the three-pole, single throw pressure responsive switch 26 disposed within the seat 28 of the automobile. This contact 84 is connected to a ground wire 88 by a conductor 86 mounted on an insulator attached to the cover 70 of the pressure switch.

In the drawing, the electrically actuated signal 66 is connected to wire 50 which latter wire connects the headlight switch to the headlights. However, in a preferred embodiment, the electrically actuated signal 66 is connected by a conductor to the tail light terminal on the main light switch or at any locus on the conductor connecting the tail light terminal of the main light switch to the tail lights. If the electrically actuated signal 66 is connected to the light circuit in this manner, then this signal will be actuated when either the headlights or the parking lights have been left on and the driver has departed from the autombile as will be more particularly described hereinafter.

Although the electrically actuated signals preferably take the form of small signal lamps which can be mounted in the dashboard of the automobile or on the inside of the door or in any other convenient location, they can also take the form of audible signal units such as buzzer units.

The three-pole, single throw pressure responsive switch 26 is mounted in the front seat 28 of the automobile such that when the operator of the automobile is sitting in the driving position, the weight of the operator will force the switch cover 70 to move downwardly compressing springs 72, 74 and 76 and also breaking the connection between contacts 78, 84 and 90 and their respective ground wires 82, 88 and 94 since conductors 80, 86 and 92 are mounted on insulators attached to the switch cover 70 and move away from the contacts with the downward movement of the cover. When the driver departs from the automobile, the springs 72, 74 and 76 force the cover 70 upward thereby completing the connection between the contacts and their respective ground wires. It is apparent, of course, that a plurality of single-unit pressure responsive switches can be used instead of the three-pole, single throw pressure responsive switch as illustrated in the drawing.

The pressure responsive switch connected to the ignition switch consists of a pair of contacts 98 and 100 which are closed by positioning the key in any position in the key-controlled ignition switch. A leaf spring 104 is connected to the contact 100 and moves this contact 100 away from contact 98 when the ignition key 63 is withdrawn from the ignition switch 18. It will be noted from FIG. 2 that the key 63, when placed in the ignition switch, moves against the insulator 102 mounted on contact 100.

A driver operating an automobile provided with the signal system of the invention will be immediately advised by the status of the signal lights or the buzzer units as to whether he is departing from the automobile with the key in the ignition switch and as to whether one or more of the current consuming devices is still drawing current from the battery.

For example, if the driver departs from the automobile leaving the key in the off-position of the ignition switch, the signal lamp identified by reference numeral 22 will become illuminated. By positioning the key 63 in the off-position of the ignition switch 18, the contacts 98 and 100 of the single throw pressure responsive switch are closed permitting current to flow from the battery 10 through wires 14 and 16, contacts 98 and 100, wire 20, signal lamp 22 and wire 24 to the three-pole, single throw pressure responsive switch 26. Since the operator has departed from the automobile, the spring 76 as well as the springs 72 and 74 of the three-pole pressure responsive switch is in the expanded position and the switch cover 70 has moved upwardly in accordance with the expansion of the springs. As previously set forth, the conductor 92 and conductors 86 and 80 are mounted on insulators attached to the switch cover 70, and the expansion of the springs and upward movement of the switch cover brings the conductor 90 into position such that it connects the contact 92 with ground wire 94 thereby completing the circuit from the battery 10 through the single throw pressure responsive switch and signal lamp 22 to the ground wire 94.

In the event that the operator departs from the automobile leaving the light switch 48 in the closed position, current will flow from the battery 10, through wires 14, 30 and 46, switch 48, wire 64, signal lamp 66, wire 68, contact 84 and conductor 86 to ground wire 88 thereby completing a circuit from the battery through the light switch and signal lamp to ground. Completion of this circuit will, of course, illuminate the signal lamp 66 and inform the driver that the light switch is closed.

In the event that the operator departs from the automobile leaving the radio switch 34 in the closed position, current will flow from the battery 10 through wires 14, 30 and 32, radio switch 34, wires 36 and 40, signal lamp 42, wire 44, contact 78 and conductor 80 to ground wire 82 thereby completing a circuit from the battery through the radio switch and signal lamp to ground. The completion of this circuit will illuminate signal lamp 42 and inform the driver of the automobile that the radio switch is closed.

It is apparent, of course, that when the operator of the automobile is occupying the driving position, the signal lamps will not be illuminated even though the switches of the current consuming devices are closed because the weight of the operator will actuate the pressure responsive switch and break the connections between the contacts therein and their respective ground wires.

I claim:

1. A signal system for an automobile having a battery, a plurality of switch controlled current consuming device circuits energized by said battery, and a key controlled ignition switch, comprising a pressure responsive switch associated with said ignition switch wherein the contacts of said pressure responsive switch are closed by positioning the key in any position in said ignition switch, a conductor connecting one contact of said pressure responsive switch to said battery and a conductor connecting the other contact of said pressure responsive switch to an electrically actuated signal, conductors connecting said current consuming device circuits at a locus in each circuit extending from the cold-terminal of the current consuming device switch to the current consuming device to separate electrically actuated signals, an operator actuated multi-pole pressure responsive switch disposed within the seat of said automobile and conductors connecting said electrically actuated signals to separate poles of the multi-pole pressure responsive switch.

2. A signal system for an automobile having a battery, a switch controlled radio energized by said battery, a lighting system energized by said battery including a switch controlled head light circuit, a switch controlled parking light circuit and a tail light circuit in series with said head light circuit and in series with said parking light circuit, and a key controlled ignition switch, comprising a pressure responsive switch associated with said ignition switch wherein the contacts of said pressure responsive switch are closed by positioning the key in any position in said ignition switch, a conductor connecting one contact of said pressure responsive switch to said battery and a conductor connecting the other contact of said pressure responsive switch to a first electrically actuated signal, a conductor connecting said radio at a locus in the circuit extending from the cold-terminal of the radio switch to the radio to a second electrically actuated signal, a conductor connecting said tail light circuit to a third electrically actuated signal, an operator actuated multi-pole pressure responsive switch disposed within the seat of said automobile, conductors connecting said electrically actuated signals to separate poles of the multi-pole pressure responsive switch.

References Cited in the file of this patent

UNITED STATES PATENTS

| | | |
|---|---|---|
| 1,387,798 | Miller | Aug. 16, 1921 |
| 2,613,258 | Azano | Oct. 7, 1952 |
| 2,799,843 | Savino | July 16, 1957 |